Figure 1:
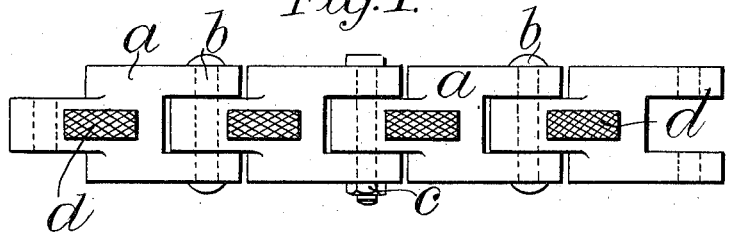

No. 736,683. PATENTED AUG. 18, 1903.
S. BUTLER.
ANTISKIDDING DEVICE FOR VEHICLE WHEELS.
APPLICATION FILED APR. 18, 1903.

NO MODEL. 3 SHEETS—SHEET 1.

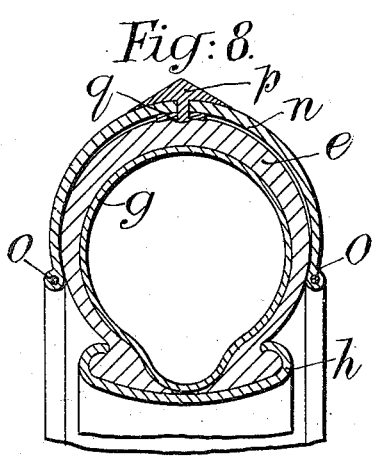
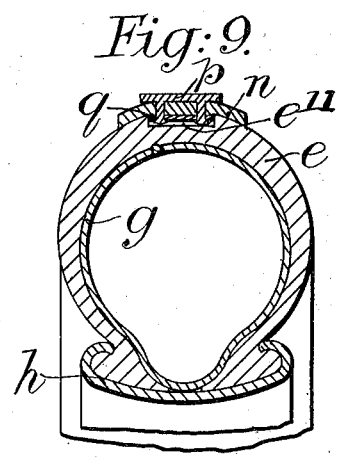
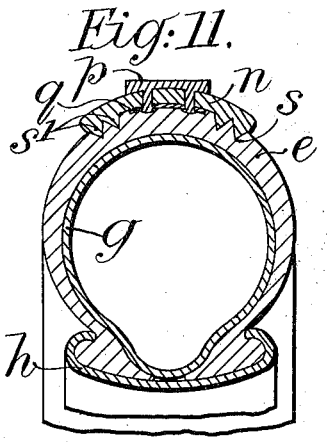
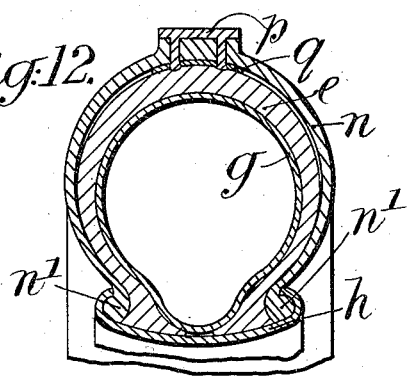

No. 736,683. PATENTED AUG. 18, 1903.
S. BUTLER.
ANTISKIDDING DEVICE FOR VEHICLE WHEELS.
APPLICATION FILED APR. 18, 1903.
NO MODEL. 3 SHEETS—SHEET 3.
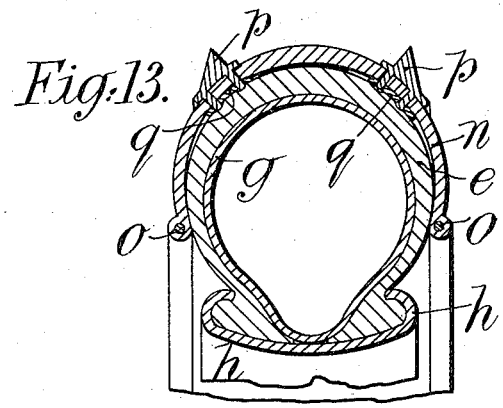
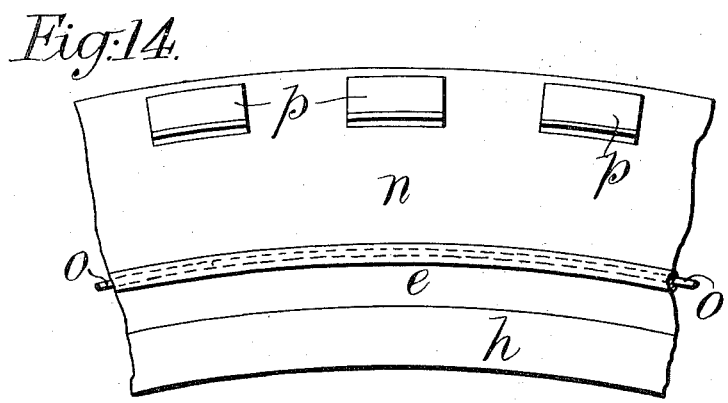
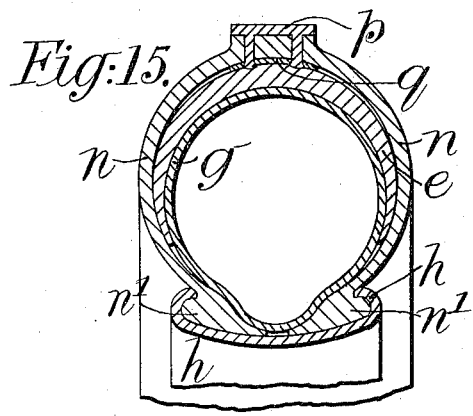

No. 736,683. Patented August 18, 1903.

UNITED STATES PATENT OFFICE.

SAMUEL BUTLER, OF WESTBURY-ON-TRYM, ENGLAND.

ANTISKIDDING DEVICE FOR VEHICLE-WHEELS.

SPECIFICATION forming part of Letters Patent No. 736,683, dated August 18, 1903.

Application filed April 18, 1903. Serial No. 153,264. (No model.)

*To all whom it may concern:*

Be it known that I, SAMUEL BUTLER, a citizen of the United Kingdom of Great Britain and Ireland, residing at Westbury-on-Trym, England, have invented a certain new and useful Improvement in Means for Preventing the Skidding or Side-Slipping of Motor-Cars, Bicycles, and other Vehicles, of which the following is a specification, such as will enable others skilled in the art to which it appertains to make and use the same.

The object of my invention is to prevent the skidding or side-slipping of cycles, motor-cars, and the like.

The invention consists of a flexible chain-like band or ring, which I place or fit around the periphery or tread of the tire, or of a belt of any suitable material—such as india-rubber, india-rubber insertion, leather, canvas, or any combination of such materials—provided with metal plates, studs, rivets, screws, links, chains, teeth, or the like. The chain-like band, ring, or belt is preferably held in position by a groove formed in the tread of the tire; but it may be retained or held in position by any other suitable means, such as by clips or rivets or by side chains or straps extending around or attached to the rim of the wheel. In one of its most simple forms the band is made of steel links, which are formed to fit each other, one end of each link being fork or jaw shaped and the other end shaped to fit into the fork of the next link in such a manner that the links can be held together by a pin, rivet, or the like. The edges of the chain are sufficiently sharp to be forced into the ground by the weight of the car or cycle, and while offering no resistance to forward motion they effectively prevent side movement or side slip of the car. The outer surface of the bands may be roughened, if found necessary, to increase their gripping power upon the road. This may be done either by using links with a specially-cut surface or by raising lumps or projections on the links. To give the band a better hold on the tire, I may make the edges of the links project slightly on the inside, so that when pressure is applied to the same these projecting edges will press into the tire. The band or belt may be made in one piece, in which case it is preferably put upon the tire when the same is deflated, and the tire is then inflated, or the band may be made in one or more pieces and ends of the same joined together in any convenient manner. The belt may be specially shaped to fit the tire or may be held thereon by any suitable means.

I will now describe my invention with reference to the accompanying drawings, in which—

Figure 2:
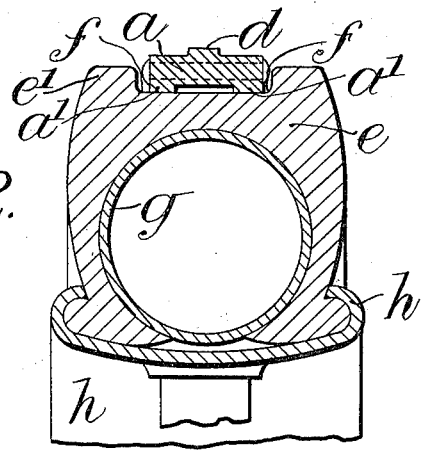
Figure 3:
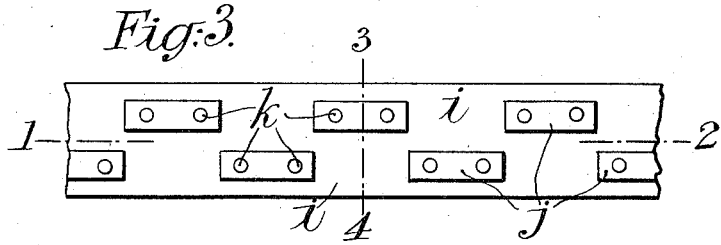
Figure 4:
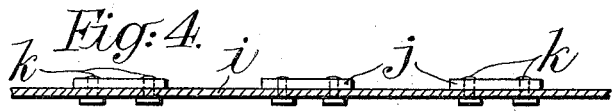
Figure 5:
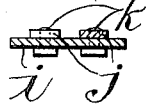
Figure 6:
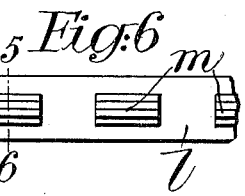
Figure 7:

Figure 1 shows a plan view of four links $a\ a$ of my chain-like band and shows the links held together by two rivets or pins $b\ b$ and one bolt and nut $c$. The drawing also shows raised projections $d\ d$ on the links to increase their gripping power upon the road. Fig. 2 shows a sectional view of a pneumatic tire $e$, having raised edges $e'$ on its periphery and forming groove $f$, into which is placed a chain-like band similar to that shown in Fig. 1, on the under side of which are the projecting edges $a'\ a'$. $g$ is the inner tube of the tire, which tire is attached to the rim $h$ of a wheel. Fig. 3 shows a plan view of a leather or other flexible belt $i$, provided with metal plates $j$, which are fastened to the belt by rivets $k$. Fig. 4 shows a sectional view on the line 1 2 of the belt shown in Fig. 3. Fig. 5 shows a sectional view on the line 3 4 of the belt shown in Fig. 3. Fig. 6 shows a plan view of a belt $l$, in which plates $m$, with roughened surface, are attached by riveting. This is a smaller form of belt and is specially suitable for cycles or light motor-cars. Fig. 7 shows a sectional view on the line 5 6 of the belt shown in Fig. 6. Figs. 8, 9, 10, 11, and 12 show modified forms of my invention as applied to a common or usual kind of pneumatic tire $e$, mounted on rim $h$ and having inner tube $g$. In Fig. 8 the invention takes the form of a band $n$, which embraces the tread and part of the sides of the tire and along the edges of which are wires $o\ o$ to keep the band in shape and retain it in place. Metal plates $p$ of cone-section and having stems for riveting are fixed to the band by washers $q$, over which the ends of the stems are riveted. In Fig. 9 the tire $e$ is recessed at $e''$ to receive the washers $q$ and the riveted or burred ends of the stems of plates $p$. The recess $e'$ is sufficient to hold the band in its place. In Fig. 10 a wide rib $r$ is formed on the tread of the tire $e$, over which the band $n$ fits, being specially shaped by molding or otherwise for the purpose. The plates $p$, with stems and washers $q$, are used on this band. In Fig. 11 grooves $s$, formed in the tire $e$, receive the ribs $s'$, formed on the band $n$. Plates $p$, with stems and washers $q$, are attached to the band $n$. In Fig. 12 the band $n$ is wide and embraces the tread and the sides of the tire $e$. The edges of the band are enlarged at $n'$ and fit into the rim $h$, by which means the band is held in place. Plates and washers are also used here. Fig. 13 shows a further modified form of my invention, in which the plates or studs $p$ are arranged in two rows along the band $n$, which forms the tread of the tire and at such positions that they do not touch or only just touch the ground when the wheel is upright; but if the wheel is on a slope or is slipping sidewise they are pressed into the ground. Similar reference-letters are used as those in Fig. 8. Fig. 14 shows a side elevation of a portion of a tire similar to that shown in Fig. 13. In Fig. 15 the band $n$ is formed with enlarged edges $n'$, sufficiently strong to hold the body $e$ of the tire in place.

My invention may be made in many different designs or styles, those shown being only examples of kinds which I consider suitable for general use. The links, plates, belts, or other parts of the invention may vary in size and shape as requirements may necessitate. For racing cycles or cars the chain-like bands or the belts may be made very light and the links in the band may be of any desired shape or size. The metal studs may be made two on the one plate far enough apart for the belt to lie between them, the points bearing on the ground, or they may be made with any number of points projecting through holes in the belt.

The links, plates, studs, or the like used in my invention will afford great protection to the tire and in the case of pneumatic tires render them much less liable to puncture.

Having now particularly described and ascertained the nature of my invention and in what manner the same is to be performed, I declare that what I claim is—

1. In combination a tire having a peripheral groove, a belt lying in the groove and a plurality of projections in the upper and lower face of the belt.

2. In combination with a tire a chain belt lying on the tire, the chain comprising links having integral projections in the upper and lower faces, substantially as described.

3. In combination with a tire having a grooved periphery, a chain belt lying in the groove, said belt comprising pivotally-connected links having lugs on their upper and lower faces.

In witness whereof I have hereunto set my hand in presence of two witnesses.

SAMUEL BUTLER.

Witnesses:
W. C. H. CROSS,
J. J. DODD.